April 21, 1953 W. C. SCHMIDT 2,635,663
CUTTER KNIFE

Filed Nov. 30, 1950 2 SHEETS—SHEET 1

*INVENTOR.*
WILLIAM C. SCHMIDT
BY
*J. Warren Kinney, Jr.*
ATTORNEY

April 21, 1953 W. C. SCHMIDT 2,635,663
CUTTER KNIFE

Filed Nov. 30, 1950 2 SHEETS—SHEET 2

INVENTOR.
WILLIAM C. SCHMIDT
BY
J. Warren Kinney Jr.
ATTORNEY

Patented Apr. 21, 1953

2,635,663

UNITED STATES PATENT OFFICE 2,635,663

CUTTER KNIFE

William C. Schmidt, Cincinnati, Ohio, assignor to The Cincinnati Butchers' Supply Company, Cincinnati, Ohio, a corporation of Ohio Application November 30, 1950, Serial No. 198,357

4 Claims. (Cl. 146—106)

This invention relates to cutter knives, and more particularly to knives of the type for use in commercial meat cutting, chopping and mixing machines.

An object of the invention is to provide a single, double-edged blade which is characterized by its narrowness as contrasted with the wide, single-edged curved knives heretofore used in commercial meat cutting machinery such as, by way of example, are disclosed in the Van Hooydonk Patent No. 1,980,304.

Another object of the invention is to provide a balanced, light weight, highly efficient cutter blade for the knife assemblies of commercial meat chopping machines, which blade is interchangeable with other similar blades, and which may be accurately balanced and maintained in balanced condition throughout its useful life.

A further object of the invention is to provide a cutter knife having a single, elongated double-edged blade portion, the shank of which terminates in a U-loop or mounting member or plate which houses and defines a cutter-knife mounting slot. The structural details and physical relationship of the U-slot with respect to the elongated blade portion is such as to positively preclude the accidental or unintentional disengagement of a cutter knife from its mounting shaft incident to operation of the meat cutting machine.

Still another object of the invention is to provide a cutter knife having the hereinabove described characteristics which may be assembled in sets on the cutter shaft of a commercial meat cutting machine, and wherein the number of knives in each set may be any number ranging from one to nine, thereby enhancing the utility of the knife.

A further object of the invention is to provide a cutter knife for meat cutting machines which is so constructed and arranged as to effectively operate without requiring the use of a comb, heretofore an essential element in commercial meat cutting machines.

Still a further object of the invention is to provide a J-shaped cutter knife which is so constructed and arranged as to be mounted close to the contour of the cutting bowl and which may be mounted whereby to compensate for any shortening of the knife which may occur from wear, grinding or the like.

Another object of the invention is to provide a cutter knife which is so constructed and arranged as to provide spacious axial clearance between the blade portions of other similar cutting knives, thereby lessening heating of the meat being cut while greatly increasing the overall capacity and efficiency of the device.

These and other objects are attained by the means described herein and as disclosed in the accompanying drawings, in which.

Figure 1:
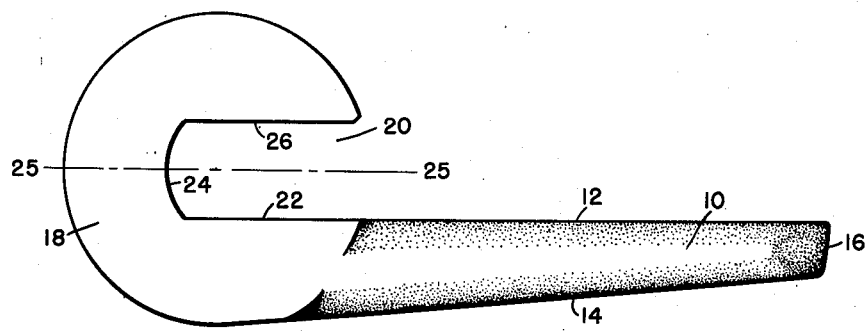
Fig. 1 is a plan view of a cutter knife embodying the teachings of the present invention.
Figure 2:
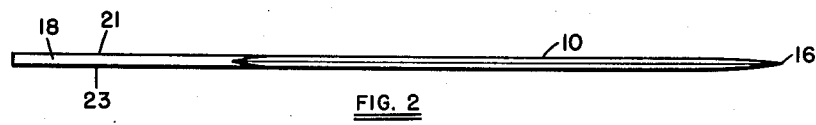
Fig. 2 is a side view of the knife of Fig. 1.
Figure 3:
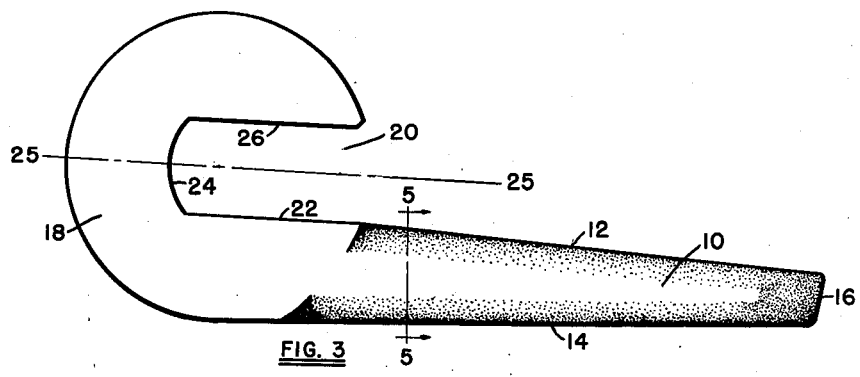
Fig. 3 is a view similar to Fig. 1 illustrating a modified form of knife.

With reference now to Figs. 1 and 3, it will be observed that the cutter knife comprises an elongated blade portion 10, the opposite sides 12 and 14 of which are sharpened to provide keen cutting edges. The outer free end 16 is likewise sharpened, as best disclosed in Figs. 2 and 4.

The shank portion of blade 10 terminates in an integral U-loop 18 for defining a knife mounting member or friction plate having therein a slot 20 bounded by edges 22, 24 and 26, wherein edges 22 and 26 are disposed in substantial spaced parallelism and equidistant from the longitudinal axis 25—25 of the slot. It will be understood that the dimensional characteristics of mounting slot 20 are such as to facilitate association of the knife with the flattened portion 28 of the cutter shaft 30 of a commercial meat chopping machine, Fig. 6.

Figure 4:
Fig. 4 is a side view of the knife of Fig. 3.
Figure 5:
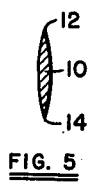
Fig. 5 is a sectional view taken on line 5—5 of Fig. 3.

Mounting member or friction plate 18 is provided with flat, smooth, even, parallel opposite axial faces 21 and 23, wherein the lateral spacing between said faces represents the maximum thickness of blade portion 10, see Figs. 2 and 4.

The cutter shaft 30 is provided with a plurality of sets or pairs of flats, one pair for the slot of each knife, wherein the axis of each pair of flats is disposed at an angle with reference to adjacent laterally spaced flats. That is, if four single blades are to be mounted as a set, the angular relationship of the flats for each blade will be turned 90 degrees relative to adjacent flats. If six single knives are to comprise a set, adjacent flats will be disposed 60 degrees apart. In this manner the axial relationship of each of the various knives comprising a set is positively established. The use of flats for this purpose is old in the art.

Figure 7:
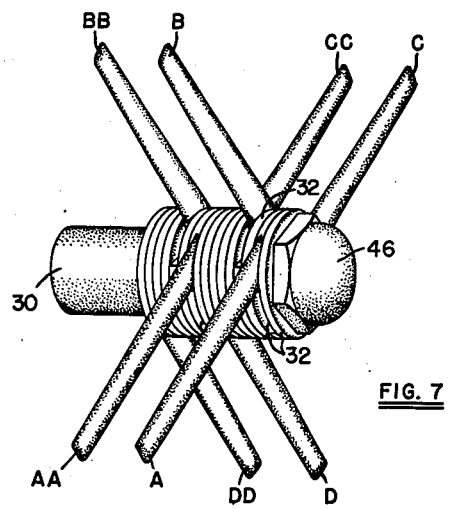
Fig. 7 is a perspective view of a knife assembly comprising two sets of four knives each.

With reference now to Fig. 7, it will be noted that the cutter knives have been mounted in two sets of four each wherein the adjacent knives are spaced 90 degrees apart.

The blades comprising each set are spiraled, in effect, around the axis of shaft 30 in such a manner that a spiral or screw effect will be imparted to the material being chopped by the knives.

For the purpose of clarity of understanding, the first knife of the first set has been identified by the letter A, the second knife by the letter B, the third and fourth by the letters C and D, respectively. A spacer collar is provided between the mounting member 18 of each blade, said collars being indicated by the numeral 32, whereby adjacent blades are laterally spaced by a dimension equal to the width of a collar.

The knives of the second set are identified by the letters AA, BB, CC and DD, wherein knives A and AA, B and BB, C and CC, and D and DD are disposed in in-phase relationship, respectively. Dynamic balance is obtained by matching the opposed blades of each set, that is, A and C, B and D, AA and CC, BB and DD.

Figure 6:
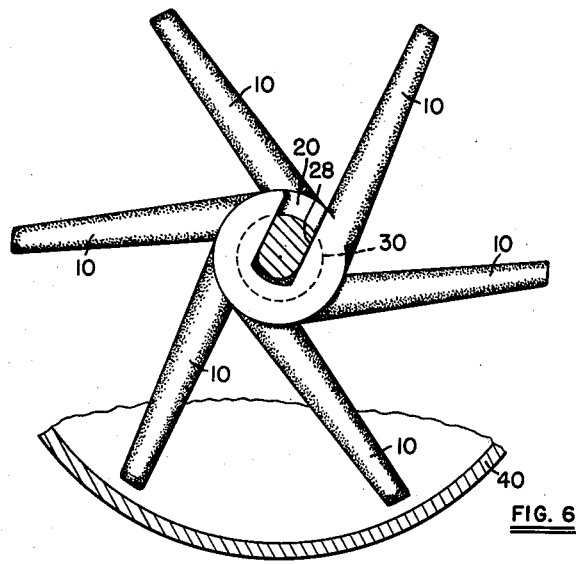
Fig. 6 is an end view of a cutter shaft provided with a plurality of cutter knives embodying the teachings of the present invention wherein six knives comprise a set, the adjacent knives being spaced apart by 60 degrees.

With reference now to Fig. 6, the numeral 40 indicates, in a fragmentary manner, the bowl portion of a conventional meat grinding machine, said bowl, as is the custom, being rotatable about a vertical axis for continuously moving the meat product toward, or into, the zone of action of the cutter knives and it may be assumed that bowl 40 is caused to rotate for bringing the meat toward the reader. For reference, and clarity of understanding of the structural details of the rotatable bowl and knife assembly of a commercial meat cutting machine, and for a detailed description of the structural details and operating characteristics of a typical commercial meat grinding machine, reference may be had to the O. C. Schmidt Patent No. 2,177,600.

The blades comprising the subject matter of the present invention may be utilized in lieu of the edged, curved cutter knives illustrated in the cited Schmidt patent without altering any of the structural details thereof.

It has been observed that the shape of the knives, and particularly their elongated characteristics, enable meat products to be rapidly and efficiently cut up into tiny, substantially uniform particles with inappreciable heating of the meat product. Heretofore the rise in temperature which occurred in meat products incident to a chopping or comminuting operation presented serious problems to the meat processors, however meat chopped in machines provided with knives of the present invention are not subjected to objectionable temperatures while being chopped.

With reference now to Figs. 6 and 7, it will be noted that the knives of an assembly are characterized by spacious axial clearance. This, coupled with the elongate characteristics of the individual knives, materially and substantially lessens the tendency for the meat products to become heated and the overall capacity and efficiency of the device is greatly increased.

It should likewise be noted that meat may be effectively chopped with blades grouped in sets of three, four or six knives without requiring the use of combs heretofore essential when using the old type cutter knives. Dispensing with the combs eliminates the friction heretofore encountered when cutter knives were caused to pass between the teeth of the comb, thereby further lessening the tendency for the meat to become objectionably warm while being chopped.

Radial adjustment of the various knives may be expeditiously accomplished by reason of the depth of mounting slots 20, it being understood that the various blades may be locked in adjusted position by reason of a compressive force applied axially of the cutter shaft by means of a nut 46.

In the preferred embodiment of the invention the cross sectional area of opposite axial faces 21 and 23 of the U-shaped mounting members 18 is sufficient to give the necessary frictional engagement with adjoining spacer collars 32 for securely, though releasably anchoring the various knives in adjusted relationship.

Each of the knives may be individually adjusted or set relative to the contour of bowl 40; and any shortening of the overall length of the knives due to wear or grinding may be compensated for by shifting the relationship of the mounting members relative to shaft 30.

As best disclosed in Fig. 7, the individual knives are secured to shaft 30 in such a manner as to preclude their flying off into space by centrifugal force in the event that they should become loose from their initially anchored relationship with the shaft.

As illustrated in Figs. 1 and 3, the inner and outer cutting edges 12 and 14, respectively, though laterally spaced, nevertheless converge throughout substantially their entire lengths toward their free outer ends which terminate in end cutting edge 16. In Fig. 1 inner cutting edge 12 is disposed in substantial spaced parallelism with the longitudinal axis 25—25 of the mounting slot 20.

In Fig. 3 the outer cutting edge 14 is disposed in substantial spaced parallelism with the longitudinal axis of the mounting slot.

Uniformly satisfactory results have been obtained in those instances wherein the effective cutting length of the blade portion 10 has been of a dimension from three to six times its mean width and wherein the lateral spacing between cutting edges 12 and 14 has varied from substantial parallelism to that degree of convergency wherein the lateral spacing at the free outer ends of said edges is approximately one-half of their spacing at their inner ends adjacent mounting member 18.

With reference again to Fig. 3, it will be noted that cutting edge 12 of the blade has been provided with a negative rake and the outer cutting edge 14 with a positive rake.

The double cutting edge construction enables the blades to be reversed, thereby doubling their effective life before having to be removed from the machine for resharpening.

What is claimed is:

1. A knife for a meat cutting machine formed as a unit of thin metal and comprising a substantially circular mounting portion and an elongated blade portion extending from the mounting portion, said mounting portion having flat and unobstructed side faces and being formed with a radially extending slot open at its outer end of greater length than a radius of the mounting portion, said slot having its open outer end facing in the direction of the outer end of the blade and being of a width adapting it to receive a blade-carrying shaft of a meat cutting machine in its inner end portion and having generally straight side edges parallel to and spaced equal distances from the said radius of the said mounting portion, said blade portion extending from the peripheral edge of the mounting portion for the full distance between a side edge of said slot and the outer end of another radius of the mounting portion at right angles to the radius followed by the slot, and said blade portion being of no greater thickness than the thickness of the mounting portion and being gradually reduced in thickness from opposite side faces towards its edges to provide the blade with sharp edges along inner and outer side edges and across its outer end.

2. A knife for a meat cutting machine formed of thin metal and comprising a mounting portion and an elongated cutting blade extending from the mounting portion, the mounting portion having flat side faces and being formed with an open-ended slot extending from a marginal portion of the mounting portion to and beyond the center of the said mounting portion and having its open outer end facing in the direction of the outer end of the blade, said slot being closed at its inner end whereby a shaft of a cutting machine fitted into the slot through the open outer end thereof may occupy the inner end portion of the slot and have its axis registering with the center of the mounting portion, said cutting blade extending from the mounting portion longitudinally of the slot and being located entirely at one side of the slot between a side edge of the slot and a marginal portion of the mounting portion spaced laterally from the said side edge of the slot, the axis of the blade extending substantially parallel to the axis of the slot whereby centrifugal force pulls the closed inner end of the slot against the shaft upon which the knife is mounted and prevents dislodgement of the knife by the centrifugal force.

3. A knife for a meat cutting machine formed as a unit of thin metal and comprising a mounting portion and an elongated blade extending from the mounting portion and having sharp inner and outer side edges, said mounting portion being formed with a straight slot leading from its marginal edge and closed at its inner end and open at its outer end, the slot having its open outer end facing in the direction of the outer end of the blade and being of a length greater than the distance between its open outer end and the center of the mounting portion and of a width adapting a blade-carrying shaft of the meat cutting machine to be fitted into the slot through the open outer end thereof and disposed at the inner end of the slot concentric with the mounting portion, and said blade extending longitudinally of the slot to one side thereof in a direction outwardly of the open outer end of the slot and having its axis substantially parallel to the axis of the slot whereby centrifugal force created during rotation of the knife-carrying shaft holds the closed inner end of the slot against the shaft.

4. A knife for a meat cutting machine comprising an elongated blade having sharpened inner and outer side edges, said blade having a shank terminating in an integral U-shaped frictional mounting member defining a slot open towards that end of the blade remote from the shank, said blade and said mounting member having a generally J-shaped contour, whereby the axis of the blade extends substantially parallel to the axis of the slot from the side of the mounting member adjacent the slot and thereby causing centrifugal force created during rotation of a shaft upon which the knife is mounted to pull the inner end of the slot against the shaft and hold the knife upon the shaft.

WILLIAM C. SCHMIDT.

References Cited in the file of this patent

UNITED STATES PATENTS

| Number | Name | Date |
| --- | --- | --- |
| 812,784 | Clay | Feb. 13, 1906 |
| 825,258 | Wollen | July 3, 1906 |
| 1,394,434 | Loffler | Oct. 18, 1921 |
| 1,950,733 | Kopke | Mar. 13, 1934 |
| 2,081,807 | Gabriel | May 25, 1937 |
| 2,149,193 | Stock | Feb. 28, 1939 |
| 2,551,049 | Pinkers | May 1, 1951 |